Nov. 17, 1964  B. S. WILDI  3,157,687
PYROMELLITONITRILE/ALCOHOL REACTION PRODUCT
Filed Feb. 29, 1960
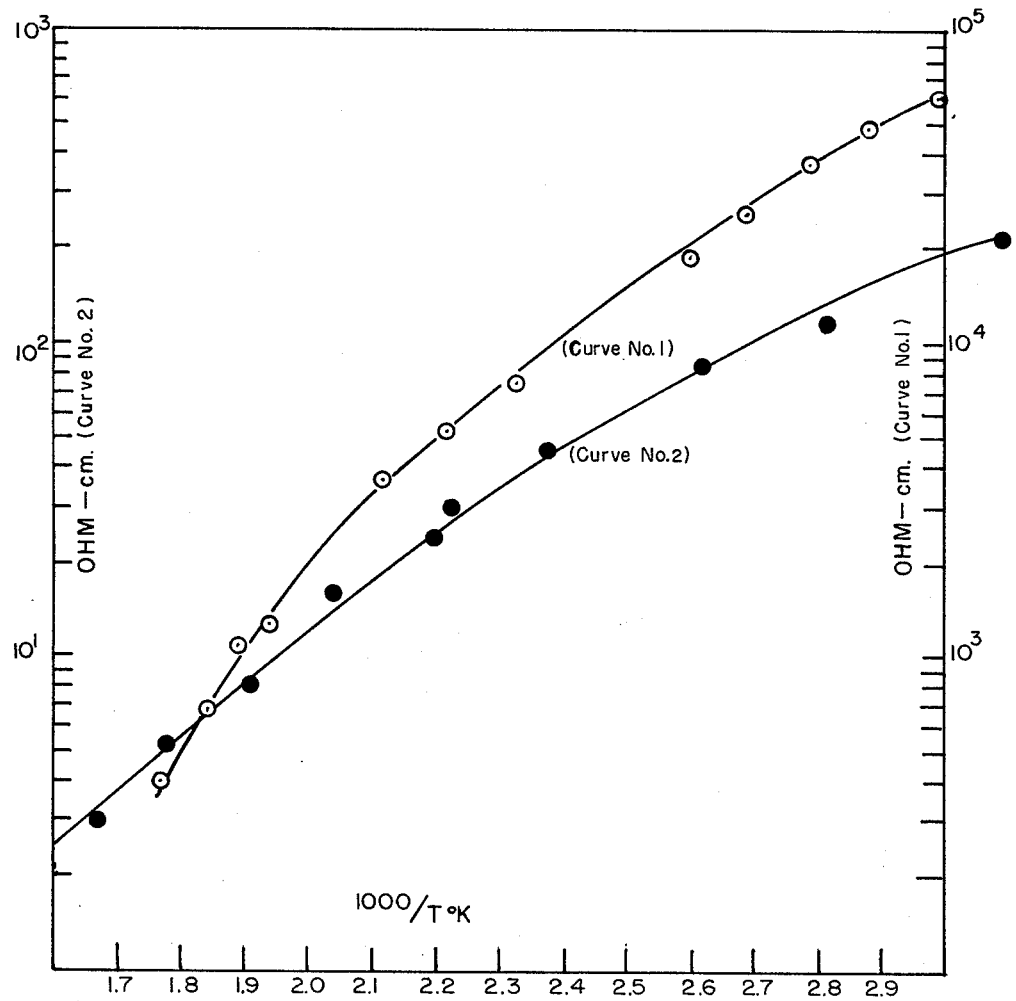
INVENTOR.
BERNARD S. WILDI
BY Lloyd B. Stevens, Jr.
ATTORNEY

United States Patent Office 3,157,687
Patented Nov. 17, 1964

3,157,687
PYROMELLITONITRILE/ALCOHOL REACTION PRODUCT
Bernard S. Wildi, Dayton, Ohio, assignor to Monsanto Company, a corporation of Delaware
Filed Feb. 29, 1960, Ser. No. 11,897
6 Claims. (Cl. 260—465)

The invention relates to new compositions and articles or bodies made therefrom which are pyromellitonitrile/alcohol reaction products, pyrolyzed pyromellitonitrile/alcohol reaction products, and articles, bodies, discs or pellets made from the pyrolyzed material.

It has now been found that alcohols and pyromellitonitrile react to form a new and useful material. These reaction products of alcohols particularly lower saturated aliphatic hydrocarbon alcohols having 1 to 6 carbon atoms, i.e. lower alkyl alcohols, and pyromellitonitrile are readily pyrolyzed to provide material which can be compressed with or without the use of a binder into articles, pellets, bodies or wafers and the like, which are especially useful as semiconductor bodies or components. With respect to the formation of the articles or bodies the term pelleted or pelleting is used broadly to include the formation of bodies of any shape by pressure with or without heating.

It is an object of this invention to provide new and useful compositions of matter.

It is another object of this invention to provide new compositions useful in permanent printing or coloring wherein the color is fixed by the application of heat.

It is another object of this invention to provide new components useful in barrier layer devices.

These and other objects of the invention will be apparent as the detailed description of the invention proceeds.

In making one of the basic compositions methanol and pyromellitonitrile are reacted together to form an almost colorless greenish-blue solid material. Actually, the greenish-blue color is probably due to the presence of a small amount of pyrolyzed or polymerized material in the reaction product, which would otherwise be colorless. If the reaction were carried out under pressure at higher than methanol reflux temperatures and/or for a longer than normal period of time, it would be expected that the product would be darker due to the formation of more pyrolyzed product. Pyromellitonitrile is a new compound which is described in detail in copending application Serial No. 696,026, filed November 13, 1957, now abandoned. The desired reaction product contains substantially two moles of methanol (or other lower alkyl alcohol) per mole of pyromellitonitrile. Normally it is preferred to use substantially in excess of a 2:1 mole ratio in making the reaction product and remove the excess alcohol after the reaction is complete. Methanol reflux temperature is quite suitable for carrying out the reaction although higher temperatures can be used in a pressure system to speed the reaction. The temperature of the reaction must be less than about 160° C. and is preferably less than 125° C. Lower temperatures than methanol reflux temperature can be used but the use of temperatures appreciably lower than this would result in a reaction proceeding at an extremely slow rate. When the reaction is carried out with methanol reflux, good agitation of the reactants is provided by the boiling methanol; whereas, if the reaction is carried out under pressure without reflux or at lower than methanol reflux temperature, mechanical agitation should be provided for the reaction for good mixing of the reactants and good heat transfer. Reaction time varies from a few hours to a number of days depending upon the reaction temperature. After the reaction is complete an almost colorless greenish-blue solid reaction product precipitates out of the reaction mixture when it is cooled. This reaction product is the desired pyromellitonitrile and methanol reaction product. Pyromellitonitrile and other lower alkyl alcohols, such as ethanol, n-propanol, isopropanol, n-butanol, isobutanol, t-butanol, n-pentanol, n-hexanol, etc., are suitably reacted at their respective reflux temperatures or lower or higher temperatures as is desired to control the rate of reaction.

Pellets can be formed from the reaction product without the use of binder using a sufficient pressure to fuse the powdered material into a pellet of the desired strength. Heat can be applied during the pelleting operation to aid in the formation of the pellets, but is not necessary. Pellets are somewhat more difficult to form after the material is pyrolyzed, and heat and/or the use of a binder during the pelleting operation will be desirable.

The pyrolyzed product is produced by heating the almost colorless greenish-blue solid product or pellets made therefrom preferably in the presence of an inert atmosphere or under high vacuum at a temperature at least above about 160–170° C., preferably in the range of about 200–700° C. The time of heating varies with the temperature and the properties of the product desired. At 300° C. heating time may vary from a few hours or less to a number of days, depending on the properties of the product desired. In copending application Serial No. 11,717, filed concurrently herewith, now Patent No. 3,060,253, heat treating at much higher temperatures than 300° C. is described for producing improved thermoelectric components. Normally, higher temperatures are desirable to form the desired pyrolyzed semiconductor material from pyromellitonitrile/ethanol or other lower alkyl alcohols, i.e. temperatures above about 400° C., preferably higher than about 450° C.

The invention will be more clearly understood from the following detailed description of specific examples thereof read in conjunction with the accompanying drawings wherein:

FIGURE 1 is a graph showing curve #1 of the electrical properties of powdered pyrolyzed pyromellitonitrile/methanol reaction product wherein resistivity is plotted versus 1000/the absolute temperature; and curve #2 of the electrical properties of a pyrolyzed pellet of the same type of material wherein resistivity is plotted versus 1000/absolute temperature.

*Example 1*

This example describes the preparation of a pyromellitonitrile/methanol reaction product and a pyrolysis product thereof. A 30 g. sample of pyromellitonitrile and 500 ml. of absolute methanol was refluxed for 24 hours. When the reaction mixture was cooled and filtered, there was recovered 17 g. of a light greenish-blue solid material which melted with decomposition at 265° C. This is largely unreacted pyromellitonitrile.

The filtrate was then concentrated and yielded 3.90 g. of yellow crystals. A sample of these yellow crystals did not melt and turned dark blue at about 165° C. On heating to 300° C. a purple-black solid was recovered. When the yellow crystals were recrystallized from methanol, a yield of 2.0 g. of solid material was recovered which did not melt but turned black at 160–170° C. More yellow crystalline material was recovered on further concentration and cooling of the filtrate, and this material was purified by recrystallization from methanol. This recrystallized material is the desired reaction product. A small amount of the reaction product was pressed into pellets. These pellets did not hold together very well. A small amount of the material was heated under vacuum at 200° C. for 1½ hours and up to 300° C. The residue product was a dark purple-blue solid.

A sample of solid reaction product was submitted for analysis. Infrared analysis showed NH or OH, C≡N and =C=N—radicals. An elemental analysis of the product yielded the following results:

| Percent | Found | Calc'd for $C_{12}H_{10}O_2N_4$ |
|---|---|---|
| C | 59.0 | 59.5 |
| H | 4.3 | 4.12 |
| N | 21.2 | 23.13 |

A sample of 5.0 g. of the reaction product was submitted to vacuum sublimation at 300° C./0.2 mm. of Hg absolute pressure for 4 hours. The residue product remaining in the apparatus after the completion of the sublimation was 2.6 g. of purple-black solid having a metallic luster. An elemental analysis of this pyrolyzed material yielded the following results:

62.2% carbon
2.4% hydrogen

*Example 2*

This is another example of the making of a pyromellitonitrile/methanol reaction product and the pyrolysis product thereof. A sample of 30 g. of pyromellitonitrile and four pints of absolute methanol was refluxed for 24 hours. The reaction mixture became dark-blue in color. This solution was filtered hot and a small amount of solid was obtained. The filtrate which was greenish-yellow in color was cooled in an ice-bath and refiltered to obtain 17.35 g. of a greenish-yellow solid substance. A small sample of this greenish-yellow solid heated at 145–155° C. begins to change color, at 160–175° C. it turns black-greenish and by 200° C. it has turned purplish-black. It did not melt.

A sample of 16.2 g. of the greenish-yellow solid pyromellitonitrile/methanol reaction product was submitted to sublimation treatment at 265° C./0.8–0.2 mm. of Hg for 18 hours. The residue material recovered from this treating step was 12.3 g. This is the desired pyrolysis product.

*Example 3*

This example describes the preparation of an ethanol/pyromellitonitrile reaction product. A sample of 30 g. of pyromellitonitrile and 2500 ml. of ethanol was refluxed for 24 hours. The reaction mixture became dark blue and was filtered while hot. The filtrate was cooled and 16.4 g. of blue crystals, M.P. 264–266° C., were recovered from the filtrate. This material starts turning color at 230–255° C. It appears that no substantial amount of reaction has occurred between the pyromellitonitrile and the ethanol.

The remaining blue crystals largely unreacted pyromellitonitrile were put back into 2500 ml. of ethanol and additional refluxing was carried on for a period of about 4 days. The reaction mixture was black colored and was filtered while hot recovering a few milligrams of black powder. The filtrate was then treated with a decolorizing substance and concentrated. The solid product recovered was light blue and did not melt at 300° C.

At pyrolysis temperatures of about 450° C. this ethanol reaction product was converted to a purplish black material closely resembling the methanol reaction product in appearance. This pyrolyzed ethanol reaction product like the pyrolyzed methanol product has semiconductor properties. Unlike the methanol reaction product the ethanol product required appreciably higher temperatures to convert it to the desired pyrolyzed product.

*Example 4*

This example describes the making of an ethylene glycol/pyromellitonitrile reaction product. A sample of 15 g. pyromellitonitrile and 250 ml. of ethylene glycol plus a trace of urea was heated at 100° C. for 48 hours. The reaction product was filtered while hot to give a solid material having an amine-like odor. This residue material was washed with methanol yielding 7.26 g. of solid product. The material did not have a melting point at a temperature as high as 320° C. On heating a sample of the material in a capillary tube using a free flame the compound decomposed giving a blue residue. The reaction product was insoluble in xylene, methanol, chloroform and is slightly soluble in boiling ethylene glycol. An elemental analysis of the reaction product yielded the following results: 53.8% C.; 3.6% H and 19.9% N.

A sample of this ethylene glycol/pyromellitonitrile reaction product was subjected to sublimation treatment at 270° C./6 mm. of Hg for 36 hours. A small amount of yellow material having a melting point greater than 320° C. sublimed out. The residue product left after the sublimation treatment was a gray solid material. An elementaly analysis of this gray material was as follows: 56.8% C., 31% H, and 21.3% N.

At pyrolysis temperatures of 450°–550° C. a grayish-black product was produced which did not resemble the pyrolyzed methanol and ethanol/pyromellitonitrile reaction products. Clearly this reaction product of ethylene glycol and pyromellitonitrile and the pyrolysis product thereof was a completely different kind of material than that formed from methanol or ethanol and pyromellitonitrile.

*Example 5*

This example describes the testing in powdered form of a sample of the pyrolyzed product of Example 1 which had been subjected to additional heat treatment. The data of this example is plotted in curve #1 of FIGURE 1. A sample of the pyrolyzed product of Example 1 was heated at 290° C./10⁻³ mm. Hg for 18 hours. The test cell was a hollow quartz cylinder placed in an upright position on a platinum plate which sealed the bottom opening in the cylinder. The internal diameter of the quartz cylinder was ¾". The heat treated powdered sample to be tested was added to the quartz cylinder to a depth of 1.4 mm. A platinum slug was inserted to the top of the quartz cylinder and a pressure of 900 g./sq. cm. was applied through this platinum slug to the powdered sample. The powdered sample in the cell was then subjected to a series of treatments involving evacuation under high vacuum, purging with nitrogen, evacuation under high vacuum and finally to nitrogen atmosphere of 5" of Hg absolute pressure for the tests. Heating of the sample was accomplished by conduction through the platinum plate upon which the quartz cylinder rested. Electrical measurements were made across the 1.4 mm. thick sample via the platinum plate and platinum slug. For obtaining the data shown in curve #1 of FIGURE 1, the heating of the sample was begun and resistance measurement from which the resistivity was calculated were made at the various temperatures shown by the plotted points of curve #1.

*Example 6*

This example describes the electrical testing of a pelleted sample of the pyrolyzed product of Example 2. A pellet was made from this material using a force of 17,000–20,000 pounds to press a pellet having the dimensions 22 x 4.5 x ½ mm. The data of the electrical testing of this pelleted sample is plotted in curve #2 of FIGURE 1. Electrical measurements were conducted on this pelleted sample under high vacuum which was an absolute pressure of about 10⁻³ mm. of Hg. In this testing resistance measurements were made on the pellets at a number of different temperatures. From these resistance measurements were calculated the resistivity which are plotted in curve #2 of FIGURE 1 as resistivity versus 1000/the absolute temperature at which the measurements were made.

The methanol/pyromellitonitrile reaction product in addition to being useful as an intermediate for the production of the pyrolyzed product is useful as a printing or coloring material. Paper, cloth or the like which has been impregnated with a methanol solution of this product can be colored by subjecting it to heat of the order of about 160° C.–200° C. The color in the cloth appears to be very fast. The pyrolyzed products of the methanol or other lower alkyl alcohol/pyromellitonitrile reaction product are especially useful in making semi-conductive bodies for components in barrier layer devices such as thermoelectrical heating or cooling devices, resistors, diodes, power rectifiers, transistors, infrared detectors photoelectric devices, thermistors, etc.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A reaction product of substantially two moles of a lower alkyl alcohol per mole of pyromellitonitrile, said reaction product having been made by heating a lower alkyl alcohol and pyromellitonitrile at at least reflux temperatures but temperatures insufficient to cause substantial pyrolysis of the reaction product, and separating said reaction product from unreacted alcohol and pyromellitonitrile.

2. A reaction product of claim 1 wherein said lower alkyl alcohol is methanol.

3. A reaction product of claim 1 wherein said lower alkyl alcohol is ethanol.

4. A pyrolyzed reaction product of claim 1 wherein said pyrolysis is carried out at a temperature sufficient to cause pyrolysis in the range of about 160° C. to about 700° C. for a sufficient time to produce a pyrolyzed product having semiconductor properties.

5. A pyrolyzed reaction product of claim 2 wherein said pyrolysis is carried out at a temperature sufficient to cause pyrolysis in the range of about 160° C. to about 700° C. for a sufficient time to produce a pyrolyzed product having semiconductor properties.

6. A pyrolyzed reaction product of claim 3 wherein said pyrolysis is carried out at a temperature sufficient to cause pyrolysis in the range of about 160° C. to about 700° C. for a sufficient time to produce a pyrolyzed product having semiconductor properties.

References Cited in the file of this patent

FOREIGN PATENTS 698,049     Great Britain _____ Oct. 7, 1953